(12) United States Patent
Saiki

(10) Patent No.: US 7,995,004 B2
(45) Date of Patent: Aug. 9, 2011

(54) DISPLAY DEVICE AND DISPLAY METHOD

(75) Inventor: Kunihito Saiki, Tokyo (JP)

(73) Assignee: Sony Corporation (JP)

( * ) Notice: Subject to any disclaimer, the term of this patent is extended or adjusted under 35 U.S.C. 154(b) by 930 days.

(21) Appl. No.: 11/823,708

(22) Filed: Jun. 27, 2007

(65) Prior Publication Data

US 2008/0001852 A1 Jan. 3, 2008

(30) Foreign Application Priority Data

Jun. 29, 2006 (JP) ................. P2006-180099

(51) Int. Cl.
*G09G 3/14* (2006.01)
*G09G 3/32* (2006.01)
*G09G 5/00* (2006.01)
*G06F 3/038* (2006.01)
*G06F 3/048* (2006.01)
(52) U.S. Cl. ............ 345/39; 345/82; 345/204; 715/763
(58) Field of Classification Search .............. 345/39, 345/82–111, 204–207, 698; 715/273, 762, 715/763, 810, 812–845, 846–855
See application file for complete search history.

(56) References Cited

U.S. PATENT DOCUMENTS 5,845,166 A * 12/1998 Fellegara et al. ............. 396/429
2004/0239663 A1 12/2004 Seki et al.

FOREIGN PATENT DOCUMENTS

| JP | 10-063213 A | 3/1998 |
| JP | 2003-177715 A | 6/2003 |
| JP | 2004-354685 A | 12/2004 |
| JP | 2005-037847 A | 2/2005 |

* cited by examiner

*Primary Examiner* — Srilakshmi K Kumar
(74) *Attorney, Agent, or Firm* — Lerner, David, Littenberg, Krumholz & Mentlik, LLP

(57) ABSTRACT

A display device for displaying an image on a light emitting display, includes addition means for adding a rim to an icon, superimpose means for superimposing the rimmed icon on the image, change means for changing a ratio of superimpose between the icon and the image, and display control means for controlling displaying the image superimposed with the rimmed icon on the display, wherein the icon is superimposed on the image in a semi-transparent manner.

5 Claims, 6 Drawing Sheets

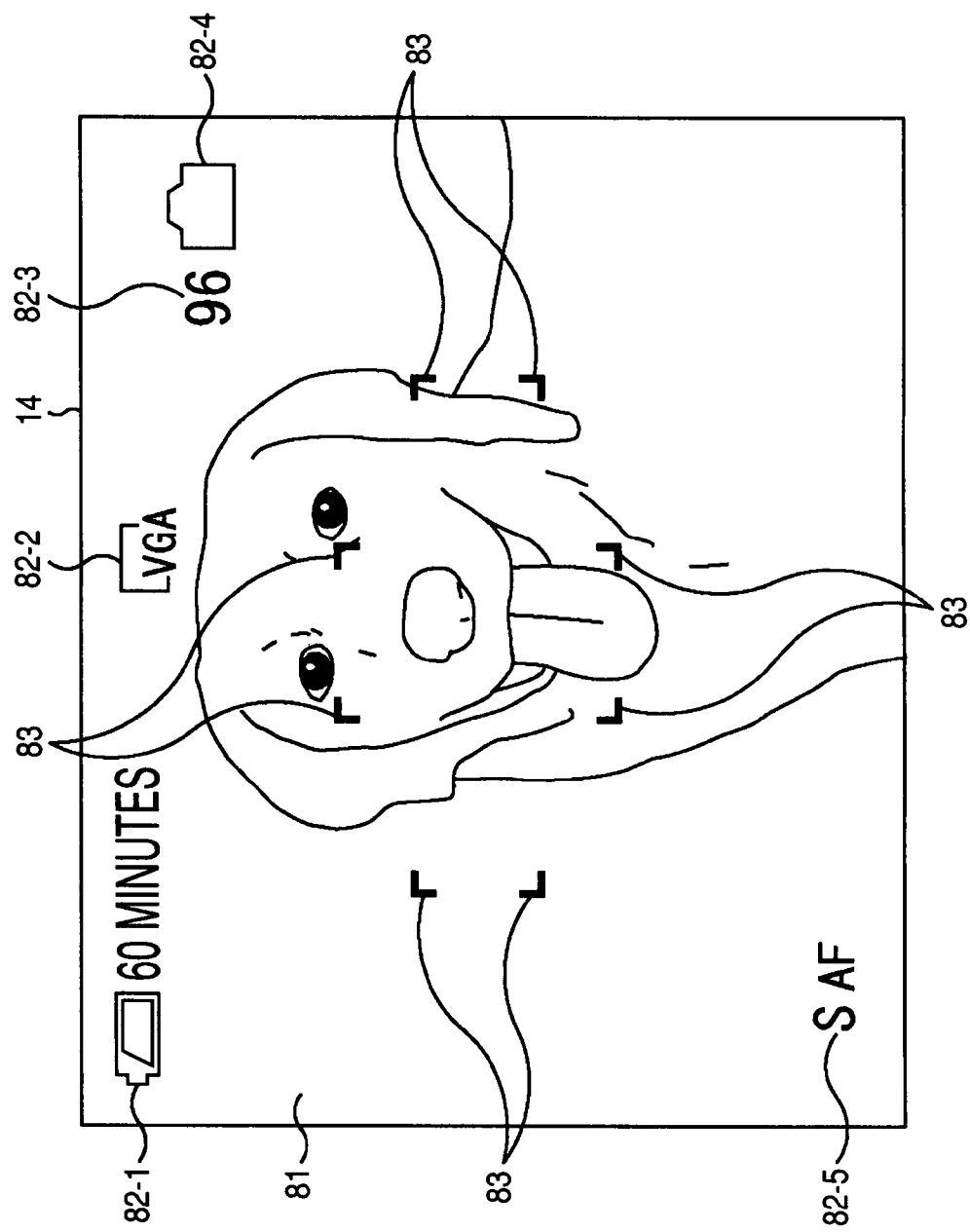

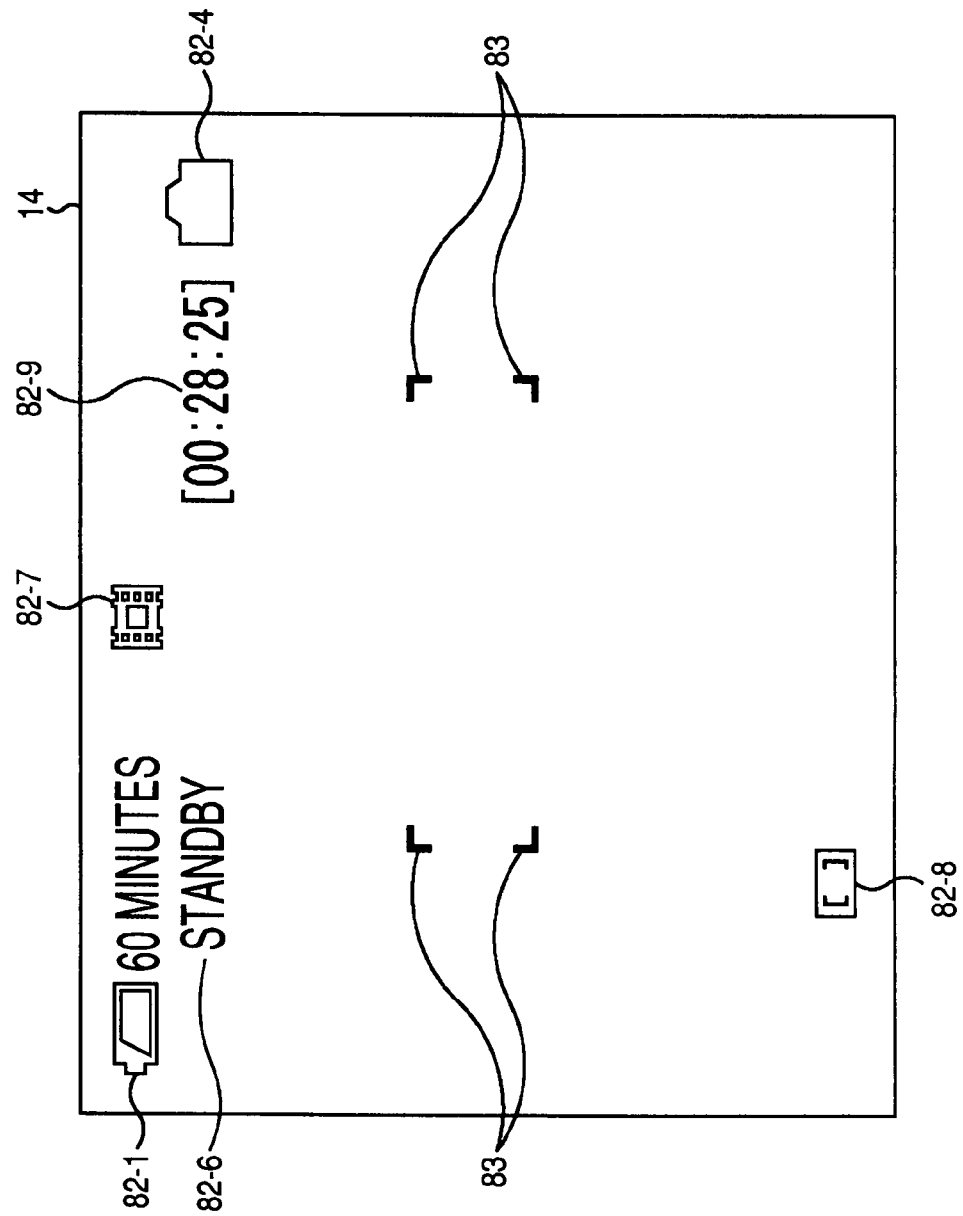

DISPLAY DEVICE AND DISPLAY METHOD

CROSS REFERENCES ROSS-REFERENCE TO RELATED APPLICATIONS

The present application claims priority from Japanese Patent Application No. JP 2006-180099, filed in the Japanese Patent Office on Jun. 29, 2006, the entire content of which is incorporated herein by reference.

BACKGROUND OF THE INVENTION

1. Technical Field

The present invention relates to a display device and a display method, and in particular to a display device and a display method for displaying an image on a light emitting display.

2. Related Art

In the present, organic electroluminescence (EL) elements utilizing electroluminescence of an organic material have attracted attention. An organic EL element is composed of an organic layer having an organic hole transport layer, an organic light emitting layer, and an electron transport layer stacked between an anode and a cathode. An organic EL element is a light emitting element capable of emitting high density light by low voltage direct-current drive.

In an organic EL display using such an organic EL element, there are formed the organic EL elements each provided with either an anode or a cathode formed by using a transparent conductive material so as to be arranged on a substrate. A hopeful view is taken on organic EL displays as next-generation flat-panel displays replacing liquid crystal displays.

In the organic EL display having such a configuration, the heat generation accompanied by the light emission causes deterioration of each organic layer forming the organic EL element. Since the deterioration of the organic layer lowers the brightness of the emitted light in each of the organic EL elements or makes the emitted light unstable, it can be said that presently the aging stability of the organic EL display is low, and the life thereof is short.

Further, each of the organic EL materials for forming R pixels, G pixels, and B pixels is deteriorated when it is driven continuously for a long time, and is gradually decreased in the brightness.

Therefore, if display is performed continuously with the same color, white for example, at a specific portion on the display, the pixels at that portion are deteriorated, and so-called burn-in is problematically caused. In the case with a digital camera or the like, various kinds of icons or characters are often displayed on a display in order for informing the user of the present operational state of the digital camera such as a shooting mode or a number of remaining shootable images. In a portion on which various kinds of icons and characters are displayed, the burn-in is caused by the difference in brightness between the icons etc. and the image targeted for shooting because of the long-term display of the icons etc.

As for the reduction of the burn-in, various kinds of proposals have ever been presented, and there are proposed technologies for reducing the burn-in like alternately reversing the color of the display data, or slightly shifting the display position of the display data on the screen.

For example, JP-A-10-63213 discloses a screen saver which detects the snow noise corresponding to the scrolling character portion of a screen of a personal computer and performs the scrolling character display while changing the color of the noise, thereby preventing the burn-in.

Although the effect for improving the burn-in is not perfect, this technology is at least effective for palliating the burn-in symptom.

SUMMARY

However, when displaying icons etc., it is common that the icons etc. are rimmed blackly in order for improving visibility. If the icon is rimmed blackly, the brightness is rapidly changed between the icon itself and the black area as the rim thereof, the burn-in caused by the rapid change in the brightness apt to become marked instead of the deterioration in the area where the icon is displayed with high brightness. In the past, it has been hardly possible to sufficiently prevent such a burn-in phenomenon.

In view of such circumstances, it is desirable that the burn-in can be reduced more easily while maintaining the visibility.

According to an embodiment of the invention there is provided a display device which is a display device for displaying an image on a light emitting display, including addition means for adding a rim to an icon, superimpose means for superimposing the rimmed icon on the image, change means for changing a ratio of superimpose between the icon and the image, and display control means for controlling displaying the image superimposed with the rimmed icon on the display, wherein the icon is displayed on the image in a semi-transparent manner.

The change means can change the ratio of the superimpose so that the icon is displayed with higher intensity than the image in accordance with time elapsed from when powered on.

The change means can change the ratio of the superimpose so that the icon is displayed with higher intensity than the image in accordance with time elapsed from when a screen of the display is switched.

According to another embodiment of the invention there is provided a display method which is a display method for displaying an image on a light emitting display, including the steps of rimming an icon, superimposing the rimmed icon on the image, changing a ratio of superimpose between the icon and the image, and controlling displaying the image superimposed with the rimmed icon on the display, wherein the icon is superimposed on the image in a semi-transparent manner.

According to the embodiments of the invention, the icon is rimmed, the rimmed icon is superimposed on the image, the superimpose ratio between the icon and the image is changed, displaying the image superimposed with the rimmed icon on the display is controlled, and the icon is superimposed on the image in a semi-transparent manner.

As described above, according to the embodiment of the invention, the burn-in can be reduced.

Further, according to the embodiment of the invention, the burn-in can more easily be reduced while maintaining the visibility.

BRIEF DESCRIPTION OF THE DRAWINGS

FIG. 5 is a diagram showing an example of a display on a screen of an organic EL display 14.

FIG. 6 is a diagram showing an example of a display on a screen of an organic EL display 14.

DESCRIPTION OF THE EMBODIMENTS

An embodiment of the invention will hereinafter be explained, in which the correspondence between configuration requirements of the invention and the embodiment described in the specification or the accompanying drawings will be exemplified as follows. The description is for confirming that the embodiment for supporting the invention is described in the specification or the drawings. Therefore, even if any embodiments described in the specification or the drawings are not described here as the embodiments corresponding to the configuration requirements of the invention, it dose not mean that such embodiments do not correspond to the configuration requirements. On the contrary, even if the embodiment is described here as one corresponding to the configuration requirements of the invention, it does not mean that the embodiment does not correspond to other configuration requirements than the above configuration requirements.

A display device according to an embodiment of the invention is a display device for displaying an image on a light emitting display and provided with addition means (e.g., a rimming section 41 shown in FIG. 2) for rimming an icon, superimpose means (e.g., a superimpose control section 42 shown in FIG. 2) for superimposing the rimmed icon on the image, change means (e.g., a superimpose ratio changing section 43 shown in FIG. 2) for changing the ratio of the superimpose between the icon and the image, and display control means (e.g., a display control section 44 shown in FIG. 2) for controlling displaying the image superimposed with the rimmed icon on the display, wherein the icon is superimposed on the image in a semi-transparent manner.

A display method according to another embodiment of the invention includes the step of rimming the icon (e.g., the step S11 shown in FIG. 3), the step of superimposing the rimmed icon on the image (e.g., the step S12 shown in FIG. 3), the step of changing a ratio of the superimpose between the icon and the image (e.g., the step S32 shown in FIG. 4), and the step of controlling displaying the image superimposed with the rimmed icon on the display (e.g., the step S13 shown in FIG. 3), wherein the icon is superimposed on the image in a semi-transparent manner.

Figure 1:
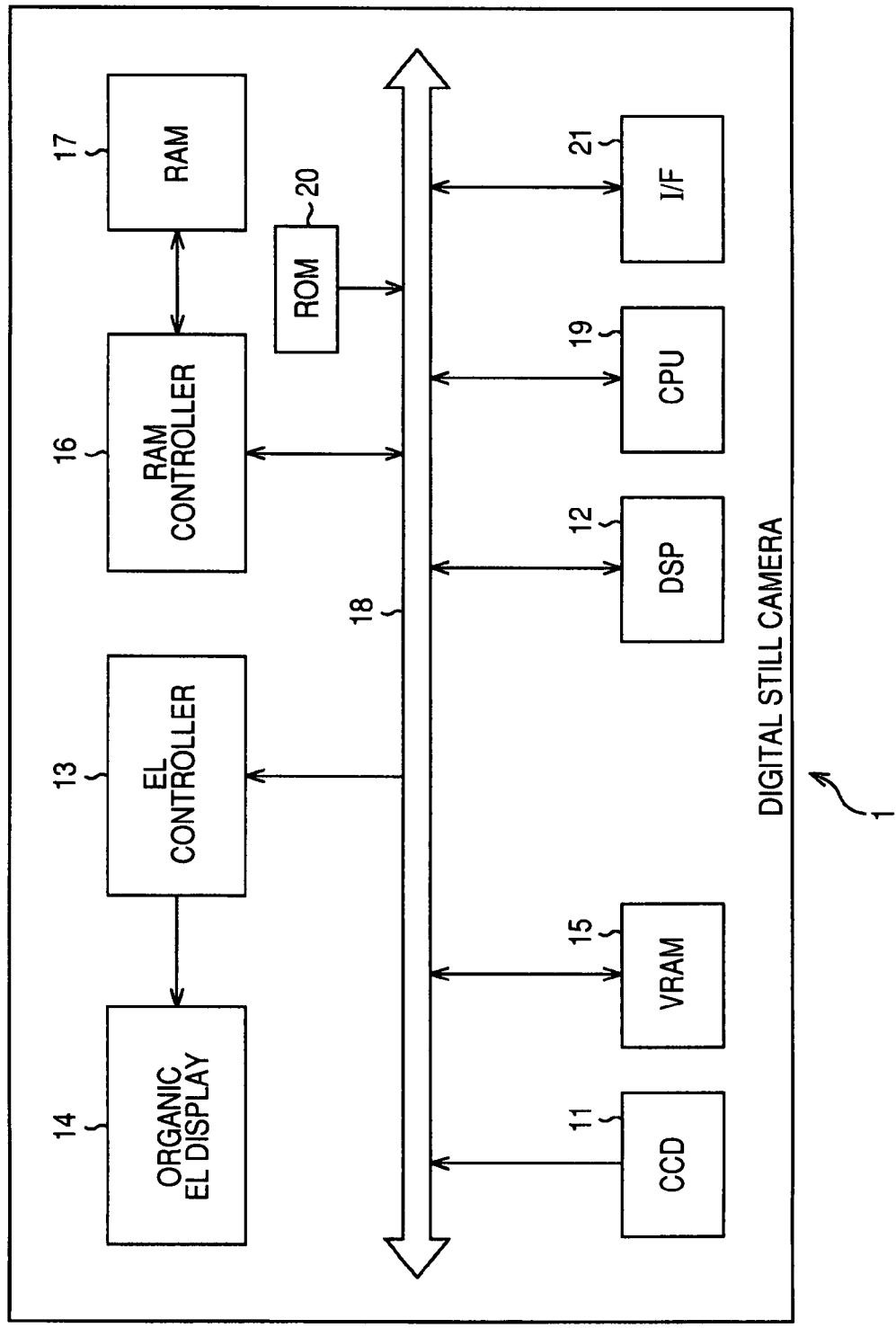
FIG. 1 is a block diagram showing the hardware configuration of a digital still camera according to an embodiment of the invention.

FIG. 1 is a block diagram showing the hardware configuration of a digital still camera 1 according to an embodiment of the invention.

The digital still camera 1 is composed mainly of a charge-coupled device (CCD) 11, a digital signal processor (DSP) 12, an electroluminescence (EL) controller 13, an organic EL display 14, a video random access memory (VRAM) 15, a random access memory (RAM) controller 16, a RAM 17, a central processing unit (CPU) 19, a read only memory (ROM) 20, and an interface (I/F) 21. The CCD 11, the DSP 12, the EL controller 13, the VRAM 15, the RAM controller 16, the CPU 19, the ROM 20, and the interface 21 are connected to each other via a bus 18.

The CCD 11 performs photoelectric conversion on an optical image of the subject provided by an optical system not shown composed of a lens, an aperture, and so on. The CCD 11 supplies the DSP 12 via the bus 18 with an electric signal (hereinafter referred to as a video signal) as a digital signal of the image of the subject obtained by the photoelectric conversion.

It should be noted that in the case in which the CCD 11 outputs an electric signal as an analog signal of the image of the subject, an analog/digital (A/D) converter not shown converts the electric signal as the analog signal output from the CCD 11 into the digital signal.

Further, it is also possible to provide a correlated double sampling (CDS) circuit for denoising, an automatic gain control (AGC) circuit for controlling the signal gain, and so on.

The DSP 12 applies various kinds of signal processing to the video signal. For example, the DSP 12 generates control signals such as an auto-focus (AF) signal, an auto-exposure (AE) signal, and so on from the video signal by the signal processing, and supplies the optical system not shown with the generated control signals. Further, the DSP 12 applies, for example, the signal processing of auto-white balance (AWB) to the video signal.

The DSP 12 supplies the EL controller 13 via the bus 18 with the video signal to which the various kinds of signal processing are applied.

Further, the DSP 12 generates an icon display signal for displaying icons showing the operational state of the digital still camera 1, such as the shooting mode of the digital still camera 1, presence or absence of flash emission, the quality of a video picture to be shot, a number of remaining shootable images as a number of images which can be shot. The DSP 12 stores the icon display signal in the VRAM 15 as icon display data.

Further, the DSP 12 applies the signal processing of rimming the icon to the icon display signal.

Further, the DSP 12 superimposes the icon display signal stored in the VRAM 15 as the icon display data on the video signal from the CCD 11. The DSP 12 supplies the EL controller 13 via the bus 18 with the video signal on which the icon display signal is superimposed.

The EL controller 13 drives the organic EL display 14 in accordance with the supplied video signal to display the video picture according to the video signal on the organic EL display 14.

The organic EL display 14 is driven by the EL controller 13 and displays the video picture according to the video signal supplied to the EL controller 13. Therefore, it is assumed that the video picture in shooting is displayed on the organic EL display 14.

The effective pixel count of the organic EL display 14 is arbitrary, and can be 500×200 pixels, for example.

Since the icons indicating the operative state of the digital still camera 1 are displayed on the organic EL display 14 together with the video picture in shooting, the user can figure out the present operative state of the digital still camera 1 from the displayed icons.

The RAM controller 16 controls recording the data on the RAM 17. For example, the RAM controller 16 retrieves the video signal from the VRAM 15 to store the video signal in the RAM 17 in response to the user holding down a release button, not shown, of the digital still camera 1. Alternatively, the video signal is recorded on a flash ROM, not shown, inside the digital still camera 1.

The CPU 19 executes a program stored in the ROM 20 or a program loaded in the RAM 17 from the hard disk or a removable medium as a recording media such as a memory card each connected to the interface 21 via the interface 21. The CPU 19 controls each section of the digital still camera 1 and executes various kinds of processes in accordance with the program in execution.

In the RAM 17, there is also stored the data necessary for the CPU 19 to perform the various kinds of processes according to needs.

The interface 21 connects the digital still camera 1 and an external device to each other. For example, the interface 21 is provided with the hard disk or the removable medium such as a memory card connected thereto according to needs.

Figure 2:
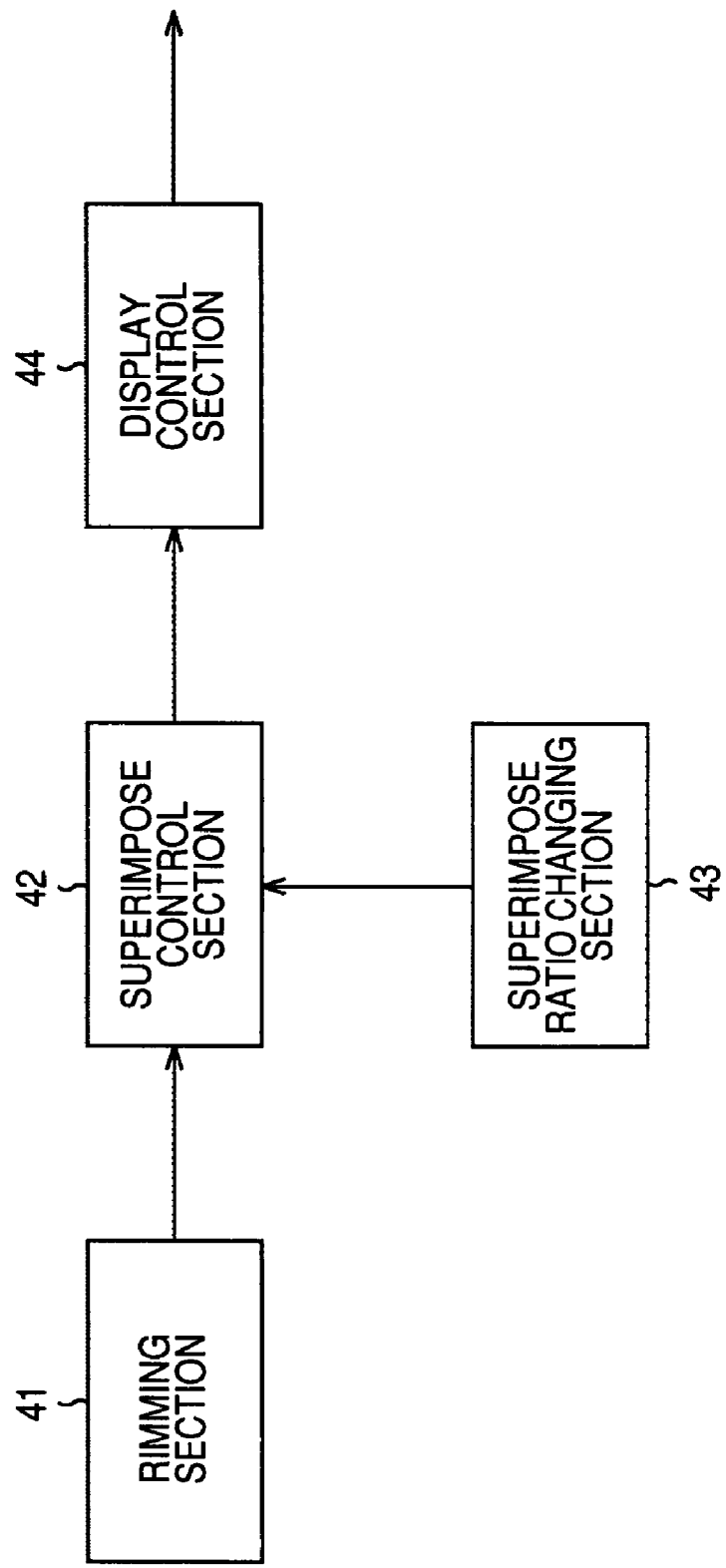
FIG. 2 is a block diagram showing the functional configuration realized by a CPU for executing the program.

FIG. 2 is a block diagram showing the functional configuration realized by the CPU for executing the program. The CPU realizes the rimming section 41, the superimpose control section 42, the superimpose ratio changing section 43, and the display control section 44 by executing the program.

The rimming section 41 adds a rim to the icon. Specifically, the rimming section 41 controls the DSP 12 to apply the signal processing of adding the rim to the icon to the icon display signal.

For example, the rimming section 41 adds the rim of a predetermined color such as white to the edges of the icon.

Alternatively, for example, the rimming section 41 adds, to the edges of the icon, the rim of a color corresponding to the color of the icon. Further, for example, the rimming section 41 adds, to the edges of the icon, the rim of a color corresponding to the color of the icon and the color of the video picture displayed on the organic EL display 14.

More specifically, for example, in the case in which the icon is white and the video image displayed on the organic EL display 14 is also white, the rim of the icon is set to be black.

By adding the rim to the icon, the user becomes to be able to easily identify the icon displayed together with the video picture.

The rimming section 41 supplies the superimpose control section 42 with the rimmed icon.

The superimpose control section 42 superimposes the rimmed icon on the video picture to be displayed on the organic EL display 14. Specifically, the superimpose control section 42 controls the DSP 12, and makes the DSP 12 superimpose the icon display signal on the video signal.

Since the icon display signal is superimposed on the video signal, when displaying the video picture on the organic EL display 14 using the video signal superimposed with the icon display signal, the semi-transparent icon is displayed on the video picture.

The superimpose ratio changing section 43 changes the ratio of the superimpose between the icon and the video picture to be displayed on the organic EL display 14. For example, the superimpose ratio changing section 43 changes the ratio of the superimpose so that the icon is displayed with higher intensity than the video picture in accordance with the time elapsed from when powered on. More specifically, the superimpose ratio changing section 43 changes the superimpose ratio between the icon and the video picture at an early period after powered on so that the superimpose ratio of the icon with respect to the video picture is set smaller to display the icon more transparently on the organic EL display 14. Then, the superimpose ratio changing section 43 changes the superimpose ratio between the icon and the video picture so that the superimpose ratio of the icon with respect to the video picture is gradually increased to display the icon more clearly on the organic EL display 14 as the time elapses from when powered on.

If the icon is displayed with higher brightness when powered on, a large current flows through the organic EL display 14 as a rush current resulting in the burn-in on the organic EL display 14. By displaying the icon more transparently when powered on, the current value can be controlled, thus preventing the burn-in of the organic EL display 14.

Further, the superimpose ratio changing section 43 changes the superimpose ratio so that the icon is displayed with higher intensity with respect to the video picture in accordance with the time elapsed from when the screen of the organic EL display 14 has been switched.

More specifically, the superimpose ratio changing section 43 changes the superimpose ratio between the icon and the video picture at an early period after the screen of the organic EL device 14 has switched so that the superimpose ratio of the icon with respect to the video picture is set smaller to display the icon more transparently on the organic EL display 14. Then, the superimpose ratio changing section 43 changes the superimpose ratio between the icon and the video picture so that the superimpose ratio of the icon with respect to the video picture is gradually increased to display the icon more clearly on the organic EL display 14 as the time elapses from when the screen of the organic EL display 14 has been switched.

For example, since the user confirms the image displayed on the organic EL display 14 immediately after switching the screen of the organic EL display 14, there is no need for immediately operating the icon, and accordingly, by displaying the icon more transparently for a longer period of time, the burn-in of the organic EL display 14 can be prevented.

The display control section 44 controls the EL controller 13 to control displaying the video picture superimposed with the icon on the organic EL display 14.

It should be noted that the display for displaying the video picture superimposed with the icon is not limited to the organic EL display 14, but is sufficiently a light emitting display, and can also be a field emission display (FED), a surface-conduction electron emitter display (SED) as one type of FED, a cathode ray tube (CRT), a plasma display panel (PDP), or a vacuum fluorescent display (VFD).

Figure 3:
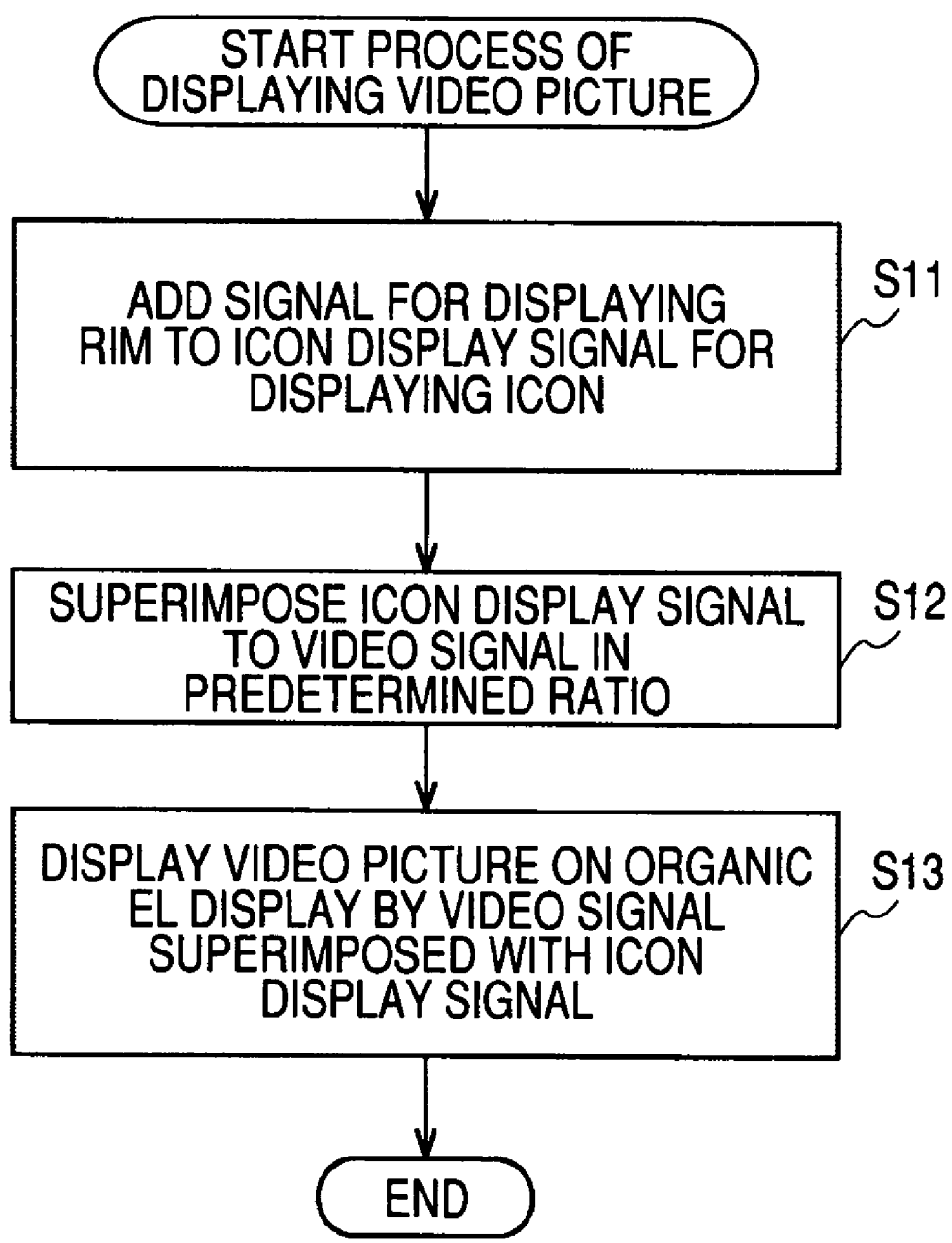
FIG. 3 is a flowchart for explaining a process of displaying a video picture.

FIG. 3 is a flowchart for explaining a process of displaying the video picture by the digital still camera 1.

In the step S11, the rimming section 41 adds the signal for displaying the rim to the icon display signal for displaying the icon. Specifically, for example, the rimming section 41 makes the DSP 12 apply the signal processing of adding the rim to the icon to the icon display signal, thereby adding the signal for displaying the rim to the icon display signal.

In the step S12, the superimpose control section 42 superimposes the icon display signal on the video signal at a predetermined ratio. In other words, for example, the superimpose control section 42 makes the DSP 12 superimpose the video signal and the icon display signal at a predetermined ratio.

More specifically, for example, the superimpose control section 42 makes the DSP 12 set the amplitude of the video signal to 50 percent of the original amplitude and the amplitude of the icon display signal to 50 percent of the original amplitude. Then, the superimpose control section 42 makes the DSP 12 superimpose the video signal and the icon display signal each having the 50 percent amplitude.

Further, for example, the superimpose control section 42 makes the DSP 12 set the amplitude of the video signal to 0 percent of the original amplitude and the amplitude of the icon display signal to 100 percent of the original amplitude. Then, the superimpose control section 42 makes the DSP 12 superimpose the video signal having the amplitude of 0 percent and the icon display signal having the amplitude of 100 percent. In other words, in this case the video signal is replaced with the icon display signal.

It should be noted that in the case in which the video picture and the icon are each displayed by data, the superimpose control section 42 can be arranged to add the video picture data and the icon data at the respective ratios.

In the step S13, the display control section 44 displays the video picture on the organic EL display 14 by the video signal superimposed with the icon display signal to terminate the process.

For example, in the case in which the video signal and the icon display signal each having the amplitude of 50 percent are superimposed, the display control section 44 is assumed to make the organic EL display 14 display the icon with transparency of 50 percent on the video picture.

As described above, by setting the superimpose ratio of the icon display signal with respect to the video signal to less than 100 percent, the icon is assumed to be displayed in a semi-transparent manner. Further, in this case, since the icon display signal is superimposed together with the signal for displaying the rim added to the icon on the video signal at a predetermined ratio, the rim added to the icon also becomes semi-transparent with respect to the video picture.

Since the icon together with the rim thereof are displayed in a semi-transparent manner, the visibility of the icon is maintained by the rim thereof, and the difference in brightness between the icon itself and the rim thereof is reduced, thus the burn-in can be reduced.

Further, for example, in the case in which the video signal having 0 percent amplitude and the icon display signal with 100 percent amplitude are superimposed, the organic EL display 14 displays the video picture replaced with the icon in the portion where the icon is displayed.

Figure 4:
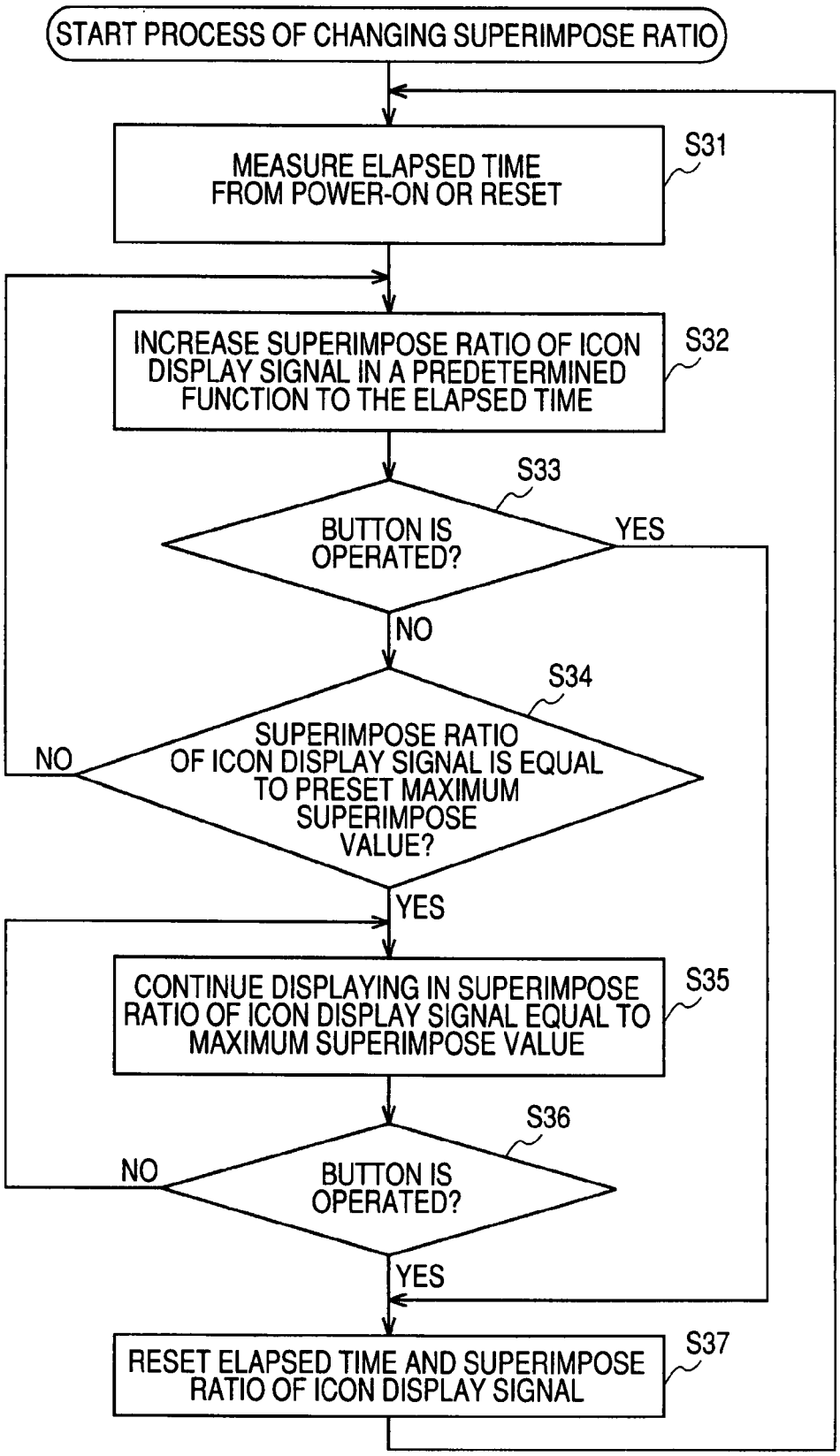
FIG. 4 is a flowchart for explaining a process of changing a ratio of superimpose.

FIG. 4 is a flowchart for explaining a process of changing the superimpose ratio by the digital still camera 1.

In the step S31, the superimpose ratio changing section 43 measures the time elapsed from when powering on or resetting the superimpose ratio. For example, in the step S31, the superimpose ratio changing section 43 measures the time elapsed from when powering on or resetting the superimpose ratio based on the time presented by the real-time clock built in the digital still camera 1.

In the step S32, the superimpose ratio changing section 43 increases the superimpose ratio of the icon display signal in accordance with a predetermined function of the elapsed time. For example, the superimpose ratio changing section 43 increases the superimpose ratio of the icon display signal so that the superimpose ratio of the icon display signal increases from 50 percent to 100 percent as the elapsed time increases.

It should be noted that the superimpose ratio changing section 43 can also be arranged to decrease the superimpose ratio of the icon display signal in accordance with a predetermined function of the elapsed time.

In the step S33, the superimpose ratio changing section 43 judges whether or not a button is operated. For example, the superimpose ratio changing section 43 judges whether or not the user operates various buttons such as the release button or menu button, a dial, a knob, a touch panel, and so on.

In the step S33, if it is judged that the button has not been operated, the superimpose ratio changing section 43 proceed to the step S34.

In the step S34, the superimpose ratio changing section 43 judges whether or not the superimpose ratio of the icon display signal is equal to the maximum superimpose value set previously. For example, in the case in which the maximum superimpose value set previously is 100 percent, the superimpose ratio changing section 43 judges whether or not the superimpose ratio of the icon display signal is equal to 100 percent.

If it is judged in the step S34 that the superimpose ratio of the icon display signal is not equal to the maximum superimpose value set previously, the superimpose ratio of the icon display signal can further be increased, and accordingly, the process goes back to the step S32, and the process of increasing the superimpose ratio of the icon display signal is repeated.

If it is judged in the step S34 that the superimpose ratio is equal to the maximum superimpose value set previously, the process proceeds to the step S35, and the superimpose ratio changing section 43 continues the display with the superimpose ratio of the icon display signal equal to the maximum superimpose value.

In the step S36, the superimpose ratio changing section 43 judges whether or not the button is operated. For example the superimpose ratio changing section 43 judges whether or not a similar operation to the step S33 is performed by the user.

If it is judged in the step S36 that the button is not operated, there is no need for changing the display condition, and the process goes back to the step S35, and the display with the superimpose ratio of the icon display signal equal to the maximum superimpose value is continued.

If it is judged that the button is operated in the step S36, or that the button is operated in the step S33, the screen of the organic EL display 14 is switched, and accordingly, the process proceeds to the step S37 where the superimpose ratio changing section 43 resets the elapsed time and the superimpose ratio of the icon display signal to, for example, the elapsed time of 0 and the superimpose ratio of the icon display signal of 50 percent, and the process returns to the step S31 to repeat the process described hereinabove.

As described above, by changing the superimpose ratio between the icon including the rimmed section and the video picture in accordance with the time elapsed from when powering on or switching the screen, the burn-in of the organic EL display 14 can more effectively be suppressed without lowering the visibility of the icon.

FIG. 5 is a diagram showing an example of display of the screen of the organic EL display 14 in a condition in which the digital still camera 1 is powered on.

On the whole screen of the organic EL display 14, there is displayed a video picture 81 of the subject. In the upper left portion of the screen of the organic EL display 14, there is displayed an icon 82-1 for indicating the remaining shootable time. In the top center of the screen of the organic EL display 14, there is displayed an icon 82-2 for indicating the image quality and the size of the video picture to be shot.

In the upper right portion of the screen of the organic EL display 14, there are displayed an icon 82-3 for indicating the number of remaining shootable images as a number of video pictures which can be shot, and an icon 82-4 for indicating whether the video signal of the shot video picture is stored in the flash ROM, not shown, inside the digital still camera 1 or in the removable medium connected to the interface 21.

In the lower left portion of the screen of the organic EL display 14, there is displayed an icon 82-5 for indicating the auto-focus mode. In the center portion of the screen, there is displayed an auto-focus reference window 83.

As described above, the organic EL display 14 displays the icons 82-1 through 82-5, which are rimmed and made semi-transparent.

It should be noted that the digital still camera 1 can be arranged to shoot not only still images but also moving images.

FIG. 6 is a diagram showing another example of display of the screen of the organic EL display 14 in a condition in which the digital still camera 1 is powered on in the case of shooting either the still image or the moving image. The same sections as shown in FIG. 5 are denoted with the same reference numeral, and the descriptions therefor will be omitted.

In the upper left portion of the screen of the organic EL display 14, there is displayed an icon 82-6 for indicating that the state of the digital still camera 1 is a recording standby state. In the top center of the screen of the organic EL display 14, there is displayed an icon 82-7 for indicating that the state of the digital still camera 1 is a moving image mode for shooting a moving image. In the lower left portion of the screen of the organic EL display 14, there is displayed an icon 82-8 for indicating the processing such as a hand tremor canceling process.

In the upper right portion of the screen of the organic EL display 14, there is an icon 82-9 for indicating the remaining shootable time, which is a time period during which moving images can be shot.

As described above, the organic EL display 14 displays some of the icons 82-1 through 82-9, which are rimmed and made semi-transparent, also in the case of shooting the still image or the moving image.

Hereinafter, the icons 82-1 through 82-9 are simply referred to as icons 82 unless there is a need for distinguishing each of the icons 82-1 through 82-9.

As described above, the icons 82 of predetermined colors provided with rims of predetermined colors are displayed together with the rims in a semi-transparent manner.

For example, since the icons 82 including the rims are displayed in a semi-transparent manner not only in the case in which the icons are rimmed whitely, but also in the case in which the icons are rimmed blackly, the differences in the brightness between the icons 82 themselves and the rims thereof are further reduced, thus the burn-in becomes hard to be caused in the organic EL display 14.

By setting the superimpose ratio between the video signal and the icon display signal to an appropriate value, the video picture can be displayed while preventing the burn-in of the organic EL display 14 without lowering the visibility of the icons 82.

Although the digital still camera 1 equipped with the organic EL display 14 is explained above, this is not a limitation. Any apparatuses equipped with a light emitting display such as the organic EL display 14 are included, and a digital video camera, a mobile phone, a portable home-use game console, a stationary home-use game console, or a television set are also included.

As described above, in the case in which the icon is displayed on the light emitting display which causes deterioration in brightness in proportion to the light emission time, the burn-in caused by displaying the icon can be reduced while maintaining the visibility of the icon.

As described above, the burn-in can be prevented by an easy process such as addition or superimpose without requiring any complicated signal processing or signal controlling.

By thus superimposing the icon on the image, the burn-in can be reduced. Further, by rimming the icon, superimposing the rimmed icon on the image, changing the superimpose ratio between the icon and the image, controlling displaying the image superimposed with the rimmed icon on the display so that the icon is superimposed in a semi-transparent manner with respect to the image, the burn-in can more easily be reduced while maintaining the visibility.

It should be noted that the series of processes described above can be performed by hardware or by software. If the series of processes are executed by the software, the program configuring the software is installed in a computer built in a dedicated hardware, or a multi-purpose personal computer capable of executing various kinds of functions by installing various kinds of programs from a program recording medium.

The program medium storing the program to be installed in the computer and set to the condition executable by the computer is, as shown in FIG. 1, composed of a removable medium as a package medium connected to the interface 21 formed of a magnetic disk (including a flexible disk), an optical disk (a compact disc-read only memory (CD-ROM), a digital versatile disc (DVD)), or a semiconductor memory, or the ROM 20 storing the program temporary or permanently, or the flash ROM not shown, or a hard disk. The program is stored in the program storage medium using a wired or a wireless communication medium such as a local area network, the Internet, a digital satellite broadcast via the interface 21 as an interface for a router or a modem.

The steps for describing the program stored in the program recording medium in the specification cover the processes performed in the order of description and in chronological order as a matter of course, and also cover the processes performed in parallel or individually even if they are not necessarily performed in chronological order.

It should be noted that the embodiment of the invention is not limited to the embodiments described above, but can be modified in various forms within the scope or the spirit of the invention.

What is claimed is:

1. A display device for displaying an image on a light emitting display, comprising:
    addition means for adding a rim having a color to an icon, in which the color of the rim corresponds to a color of the icon and to a color of image in such a manner as to enable a user to easily identify the icon such that when the color of the icon and the color of the image are the same color the color of the rim is a different color;
    superimpose means for superimposing the rimmed icon on the image;
    change means for changing a ratio of superimpose between the icon including the rim and the image; and
    display control means for controlling displaying the image superimposed with the rimmed icon on the display,
    wherein the icon and the rim are at least initially superimposed on the image in a semi-transparent manner.

2. The display device according to claim 1,
    wherein the change means changes the ratio of the superimpose so that the icon is displayed with higher intensity than the image in accordance with time elapsed from when powered on.

3. The display device according to claim 1,
    wherein the change means changes the ratio of the superimpose so that the icon is displayed with higher intensity than the image in accordance with time elapsed from when a screen of the display is switched.

4. A display device for displaying an image on a light emitting display, comprising:
    a rimming section for adding a rim having a color to an icon, in which the color of the rim corresponds to a color of the icon and to a color of the image in such a manner as to enable a user to easily identify the icon such that when the color of the icon and the color of the image are the same color the color of the rim is a different color;
    a superimposing section for superimposing the rimmed icon on the image;
    a changing section for changing a ratio of superimpose between the icon including the rim and the image; and
    a display control section for controlling displaying the image superimposed with the rimmed icon on the display,
    wherein the icon and the rim are at least initially superimposed on the image in a semi-transparent manner.

5. A display method for displaying an image on a light emitting display, comprising the steps of:
- rimming an icon with a rim having a color, in which the color of the rim corresponds to a color of the icon and to a color of the image in such a manner as to enable a user to easily identify the icon such that when the color of the icon and the color of the image are the same color the color of the rim is a different color;
- superimposing the rimmed icon on the image;
- changing a ratio of superimpose between the icon including the rim and the image; and
- controlling displaying the image superimposed with the rimmed icon on the display,
- wherein the icon and the rim are at least initially superimposed on the image in a semi-transparent manner.

* * * * *